United States Patent
Higginson et al.

(10) Patent No.: US 11,586,706 B2
(45) Date of Patent: Feb. 21, 2023

(54) TIME-SERIES ANALYSIS FOR FORECASTING COMPUTATIONAL WORKLOADS

(71) Applicant: Oracle International Corporation, Redwood Shores, CA (US)

(72) Inventors: Antony Stephen Higginson, Cheshire (GB); Octavian Arsene, Bucharest (RO); Mihaela Dediu, Manchester (GB); Thomas Elders, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 225 days.

(21) Appl. No.: 16/917,821

(22) Filed: Jun. 30, 2020

(65) Prior Publication Data

US 2021/0081492 A1    Mar. 18, 2021

Related U.S. Application Data

(60) Provisional application No. 62/939,603, filed on Nov. 23, 2019, provisional application No. 62/901,088, filed on Sep. 16, 2019.

(51) Int. Cl.
*G06F 9/44* (2018.01)
*G06F 17/18* (2006.01)
(Continued)

(52) U.S. Cl.
CPC .......... *G06F 17/18* (2013.01); *G06F 11/3409* (2013.01); *G06N 5/02* (2013.01)

(58) Field of Classification Search
None
See application file for complete search history.

(56) References Cited

U.S. PATENT DOCUMENTS 7,716,022 B1 * 5/2010 Park ................... G06Q 30/0201
703/22
10,372,572 B1 * 8/2019 Kesarwani ............. G06N 7/005
(Continued)

FOREIGN PATENT DOCUMENTS

WO    2014/055028 A1    4/2014

OTHER PUBLICATIONS

Hermine N. Akouemo et al., "Time series outlier detection and imputation", May 2022 (Year: 2022).*

*Primary Examiner* — Wei Y Zhen
*Assistant Examiner* — Lanny N Ung
(74) *Attorney, Agent, or Firm* — Invoke

(57) ABSTRACT

Techniques for time-series analysis for forecasting computational workloads are disclosed. A resource management system monitors a computing system and obtains metrics data from the computing system. The metrics data is stored as a set of historical data points of a data set. A first portion of the set of historical data points comprise an outlier that does not correspond to a seasonality pattern associated with a second portion of the set of historical data points. The resource management system tests a first time-series model that incorporates a first exogenous variable corresponding to a first exogeneous factor to determine that the first time-series model fits both the first portion of the set of historical data points and the second portion of the set of historical data points within an error threshold. Then, the resource management system selects the first time-series model to predict future data points of the data set.

19 Claims, 8 Drawing Sheets

(51) Int. Cl.
*G06F 11/34* (2006.01)
*G06N 5/02* (2023.01)

(56) References Cited

U.S. PATENT DOCUMENTS

| | | |
|---|---|---|
| 2010/0027432 A1 | 2/2010 | Gopalan et al. |
| 2011/0302112 A1* | 12/2011 | Shan .................. G06Q 10/067 |
| | | 706/12 |
| 2014/0310059 A1* | 10/2014 | Ellis .................. G06Q 30/0206 |
| | | 705/7.31 |
| 2015/0289149 A1 | 10/2015 | Becht et al. |
| 2017/0249562 A1 | 8/2017 | Garvey et al. |
| 2018/0039555 A1 | 2/2018 | Salunke et al. |
| 2018/0300737 A1* | 10/2018 | Bledsoe .............. G06F 16/2477 |
| 2019/0236497 A1* | 8/2019 | Santos .................. G16H 15/00 |
| 2019/0325328 A1* | 10/2019 | Katz ...................... G06F 17/14 |

\* cited by examiner

TIME-SERIES ANALYSIS FOR FORECASTING COMPUTATIONAL WORKLOADS

BENEFIT CLAIMS; RELATED APPLICATIONS; INCORPORATION BY REFERENCE

The subject matter of this application is related to the subject matter in a co-pending non-provisional application, entitled "System for Detecting and Characterizing Seasons," having Ser. No. 15/057,065 and filing date Feb. 29, 2016, which is hereby incorporated by reference.

The subject matter of this application is related to the subject matter in a co-pending non-provisional application, entitled "Supervised Method for Classifying Seasonal Patterns in Time Series Data," having Ser. No. 15/057,060 and filing date Feb. 29, 2016, which is hereby incorporated by reference.

The subject matter of this application is related to the subject matter in a co-pending non-provisional application, entitled "Unsupervised Method for Classifying Seasonal Patterns in Time Series Data," having Ser. No. 15/057,062 and filing date Feb. 29, 2016, which is hereby incorporated by reference.

This application claims the benefit of U.S. Provisional Patent Application 62/939,603, filed Nov. 23, 2019, which is hereby incorporated by reference.

This application claims the benefit of U.S. Provisional Patent Application 62/901,088, filed Sep. 16, 2019, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to analyzing time-series data. In particular, the present disclosure relates to techniques for performing time-series analysis for forecasting computational workloads.

BACKGROUND

Applications and data are increasingly migrating from on-premise systems to cloud-based software-as-a-service (SaaS) systems. Within such cloud-based systems, computational resources such as processor, memory, storage, network, and/or disk input/output (I/O) may be consumed by entities and/or components such as physical machines, virtual machines, applications, application servers, databases, database servers, services, and/or transactions.

On the other hand, cloud service providers must ensure that the cloud-based systems have enough resources to satisfy customer demand and requirements. For example, the cloud service providers may perform capacity planning that involves estimating resources required to run the customers' applications, databases, services, and/or servers. The cloud service providers may also monitor the execution of the customers' systems for performance degradation, errors, and/or other issues. However, because such monitoring techniques are reactive, errors, failures, and/or outages on the systems can occur before remedial action is taken to correct or mitigate the issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. TIME-SERIES ANALYSIS FOR FORECASTING COMPUTATIONAL WORKLOADS
4. ANOMALY DETECTION USING FORECASTED COMPUTATIONAL WORKLOADS
5. EXAMPLE EMBODIMENT OF TIME-SERIES MODEL INCLUDING EXOGENOUS VARIABLE
6. COMPUTER NETWORKS AND CLOUD NETWORKS
7. MISCELLANEOUS; EXTENSIONS
8. HARDWARE OVERVIEW

1. General Overview

One or more embodiments analyze historical system data and incorporate exogenous variables in time-series models trained with the historical system data. The system detects outlier data points within a data set that do not match a seasonality pattern corresponding to other data points in the data set. In order to generate a time-series model that accurately represents the entire data set, including the outlier data points, the system tests time-series models with various combinations of exogenous variables, or with exogenous variables having different parameters, representing different exogenous factors. The system selects a time-series model, incorporating one or more exogenous factors, that represents the data set including the outliers within an error threshold.

2. System Architecture

Figure 1:
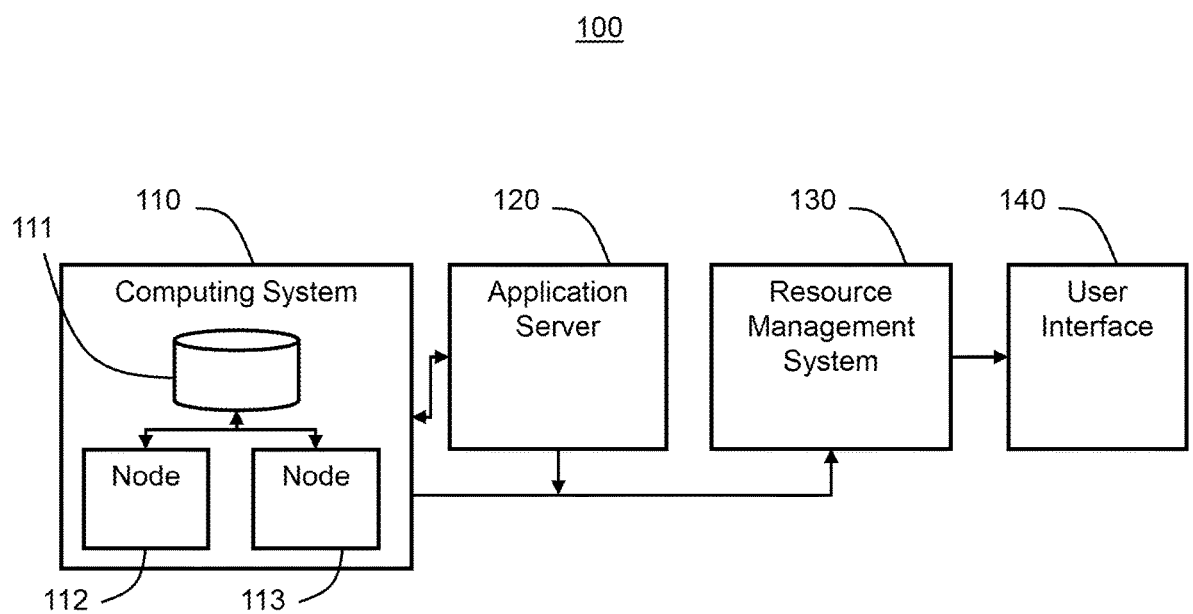
FIG. 1 illustrates a system in accordance with one or more embodiments.

FIG. 1 illustrates a system 100 in accordance with one or more embodiments. As illustrated in FIG. 1, the system 100 includes a computing system 110, application server 120, resource management system 130, and user interface 140.

The computing system 110 is a system being managed by the resource management system 130. The computing system 110 includes one or more data repositories 111 and one or more nodes 112, 113 configured to interact with the data repository 111, with each other and other nodes, and with an application server 120 to perform workloads. The computing system may include components of one or more data centers, collocation centers, cloud computing systems, on-premise systems, clusters, content delivery networks, server racks, and/or other collections of processing, storage, network, input/output (I/O), and/or other resources.

Figure 2:
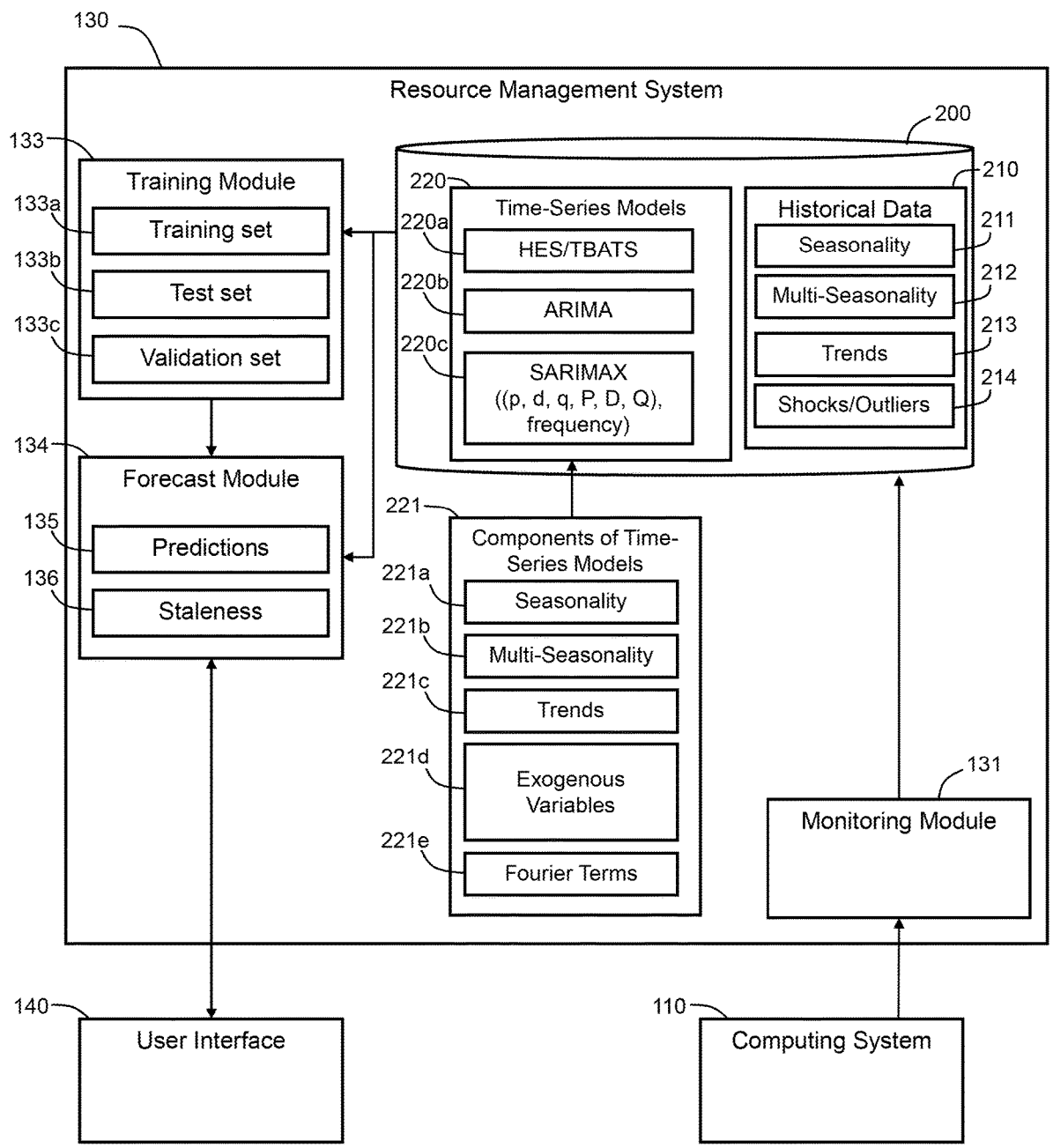
FIG. 2 illustrates a resource management system in accordance with one or more embodiments.

As illustrated in FIG. 2, the resource-management system 130 includes a monitoring module 131 with the functionality to monitor and/or manage the utilization or consumption of resources on the computing system 110. For example, the monitoring module 131 may collect and/or monitor metrics related to utilization and/or workloads on processors, memory, storage, network, I/O, thread pools, and/or other types of hardware and/or software resources. The monitoring module 131 may also, or instead, collect and/or monitor performance metrics such as latencies, queries per second (QPS), error counts, garbage collection counts, and/or garbage collection times on the resources.

In addition, resource-management system 130 may perform such monitoring and/or management at different levels of granularity and/or for different entities. For example, resource-management system 130 may assess resource utilization and/or workloads at the environment, cluster, host, virtual machine, database, database server, application, application server, transaction (e.g., a sequence of clicks on a website or web application to complete an online order), and/or data (e.g., database records, metadata, request/response attributes, etc.) level. Resource-management system 130 may additionally define an entity using a collection of entity attributes and perform monitoring and/or analysis based on metrics associated with entity attributes. For example, resource-management system 130 may identify an entity as a combination of a customer, type of metric (e.g., processor utilization, memory utilization, etc.), and/or level of granularity (e.g., virtual machine, application, database, application server, database server, transaction, etc.).

The monitoring module 131 stores the metrics related to the workload of the computing system 110 in the data repository 200. The stored metrics make up historical data 210. The historical data 210 includes time-series data and may include one or more of the following characteristics: seasonality 211, multi-seasonality 212, trends 213, and shocks or outliers 214.

The resource-management system 130 includes a training module 133 that generates time-series models for various entities associated with the monitored systems using machine learning techniques. The training module 133 obtains the historical time-series data 210 for a given entity (e.g., a combination of a customer, metric, and level of granularity) from the data repository 200. The training module 133 divides the historical time-series data into a training dataset 133a, a test dataset 133b, and a validation dataset 133c. The training module 133 trains a set of time-series models using the training dataset 133a and tests the set of time-series models using the test dataset 133b. The training module 133 validates the models using the validation set 133c. Based on the training, testing, and validation, the training module 133 generates selections of one or more time-series models for use in evaluating subsequent time-series metrics. The selections of the time-series models may be obtained from the data repository 200.

The resource-management system 130 includes a forecast module 134 that uses the time-series models generated by the training module 133 to generate forecasts of metrics representing resource consumption and/or workload on the monitored systems. In these embodiments, time-series models analyze time-series data that includes metrics collected from monitored systems to predict future values in the time-series data based on previously observed values in the time-series data.

In one or more embodiments, populated time-series models are stored in the data repository 200 for use in later forecasts. The time-series models 220 include one or more of a Holt-Winters Exponential Smoothing (HES) model and Trigonometric Seasonality Box-Cox ARMA Trend and Seasonal (TBATS) model 220a; an Auto-Regressive Integrated Moving Average (ARIMA) model 220b, a seasonal ARIMA model with exogenous variables (SARIMAX) 220c having as parameters (p, d, q, P, D, Q, frequency); or any combination of these models or alternative models.

The time-series models 220 include components 221a to 221d to account for seasonality 211, multi-seasonality 212, trends 213, and shocks or outliers 214 in the historical time-series data 210. The components of the time-series models 221 also include Fourier terms 221e which are added as external regressors to an ARIMA model 220b or SARIMAX model 220c when multi-seasonality 212 is present in the historical data 210. These components of the time-series models 221 improve the accuracy of the models and allow the models 220 to be adapted to various types of time-series data collected from the monitored systems. In one embodiment, the time-series models 220 include an exogenous variable 221d that accounts for outliers 214 in the historical time-series data 210, so that the outliers 214 in the model generated with the historical time-series data 210 do not affect values of the metrics in the forecasts of the forecast module 134.

In one or more embodiments, the time-series models 220 include one or more variants of an autoregressive integrated moving average (ARIMA) model 220b and/or an exponential smoothing model 220a.

In some embodiments, the ARIMA model 220b is a generalization of an autoregressive moving average (ARMA) model with the following representation:

$$Y_t = \sum_{i=1}^{p} \phi_i Y_{t-i} + a_t - \sum_{j=1}^{q} \theta_j a_{t-j}$$

The representation above can be reduced to the following:

$$\emptyset_p(B)Y_t = \theta_q(B)a_t$$

In the above representations, $Y_t$ represents a value Y in a time series that is indexed by time step t, $\phi_1, \ldots, \phi_p$, are autoregressive parameters to be estimated, $\theta_1, \ldots, \theta_q$, are moving average parameters to be estimated, and $a_1, \ldots, a_t$ represent a series of unknown random errors (or residuals) that are assumed to follow a normal distribution.

In one embodiment, the training module 133 utilizes the Box-Jenkins method to detect the presence or absence of stationarity and/or seasonality in the historical time-series data 210. For example, the Box-Jenkins method may utilize an autocorrelation function (ACF), partial ACF, correlogram, spectral plot, and/or another technique to assess stationarity and/or seasonality in the time series.

When the training module 133 determines that only non-stationarity is found, the training module 133 may add a degree of differencing d to the ARMA model to produce an ARIMA model with the following form:

$$\emptyset_p(B)(1-B)^d Y_t = \theta_q(B) a_t$$

When the training module 133 determines that seasonality is found, the training module 133 may add a seasonal component to the ARIMA model to produce a seasonal ARIMA (SARIMA) model with the following form:

$$\emptyset_p(B)\phi(P)(B^s)(1-B)^d(1-B^s)^D Y_t = \theta_q(B)\Theta_Q(B^s) a_t$$

In the SARIMA model, parameters 120 p, d, and q represent trend elements of autoregression order, difference order, and moving average order, respectively; parameters 120 P, D, and Q represent seasonal elements of autoregression order, difference order, and moving average order, respectively; and parameter s represents the number of seasons (e.g., hourly, daily, weekly, monthly, yearly, etc.) in the time series. $K_i$ In one or more embodiments, the training module 133 applies Fourier terms 221e to the time-series models 220. For example, when multiple seasons are detected in the time series, seasonal patterns may be represented using Fourier terms 221e, which are added as external regressors in the ARIMA model:

$$yt = a + \sum_{i=1}^{M} \sum_{k=1}^{K_i} \left[ \alpha \sin\left(\frac{2\pi kt}{P_i}\right) + \beta \cos\left(\frac{2\pi kt}{P_i}\right) \right] + N_t$$

In the above equation, $N_t$ is an ARIMA process, $P_1, \ldots, P_M$ represent periods (e.g., hourly, daily, weekly, monthly, yearly, etc.) in the time series, and the Fourier terms are included as a weighted summation of sine and cosine pairs.

The time-series models 220 may include exogenous variables 224 that account for outliers 214 in the historical data 210 and represent external effects and/or shocks. In one embodiment, the training module 133 adds the exogenous variable 224 to the ARMA model, above, to produce an autoregressive moving average model with exogenous inputs (ARMAX) model with the following representation:

$$Y_t = \sum_{i=1}^{p} \phi_i Y_{t-i} + \sum_{k=1}^{r} \beta_k X_{t-k} + \varepsilon_t + \sum_{j=1}^{q} \theta_j a_{t-j}$$

In the above representation, $\beta_1, \ldots, \beta_r$ are parameters of time-varying exogenous input X. In additional embodiments, the training module 133 includes an exogenous in the ARIMA and/or SARIMA models. In a computing system 110, the exogenous variable may represent system backups, batch jobs, periodic failovers, and/or other external factors that affect workloads, resource utilizations, and/or other metrics in the time series. These external factors may cause spikes in a workload metric that do not follow an underlying seasonal pattern of the historical time-series data 210.

In one or more embodiments, the exponential smoothing model includes a trigonometric seasonality Box-Cox ARMA Trend Seasonal components (TBATS) model. The TBATS model includes the following representation:

$$y_t^{(\lambda)} = l_{t-1} + \Phi \cdot b_{t-1} + \sum_{i=1}^{T} s_{t-m_i}^{(i)} + d_t$$

$$l_t = l_{t-1} + \Phi \cdot b_{t-1} + \alpha \cdot d_t$$

$$b_t = \Phi \cdot b_{t-1} + \beta \cdot d_t$$

$$d_t = \sum_{i=1}^{p} \varphi_i \cdot d_{t-1} + \sum_{i=1}^{q} \theta_i \cdot e_{t-i} + e_t$$

In the above representation, T is the number of seasonalities, $m_i$ is the length of the ith seasonal period, $y_t^{(\lambda)}$ is the time series Box-Cox transformed at time t, $s_t^{(i)}$ is the ith seasonal component, $l_t$ is the level, $b_t$ is the trend with damping effect, $d_t$ is an ARMA(p, q) process, and $e_t$ is Gaussian white noise with zero mean and constant variance. In addition, $\Phi$ is a trend damping coefficient, $\alpha$ and $\beta$ are smoothing coefficients, $\phi$ and $\theta$ are ARMA(p, q) coefficients.

The seasonal components of the TBATS model are represented using the following:

$$s_t^{(i)} = \sum_{j=1}^{k_i} s_{j,t}^{(i)}$$

$$s_{j,t}^{(i)} = s_{j,t-1}^{(i)} \cdot \cos(\lambda_i) + s_{j,t-1}^{*(i)} \cdot \sin(\lambda_i) + \gamma_1^{(i)} \cdot d_t$$

$$s_{j,t}^{*(i)} = -s_{j,t-1}^{(i)} \cdot \sin(\lambda_i) + s_{j,t-1}^{*(i)} \cdot \cos(\lambda_i) + \gamma_2^{(i)} \cdot d_t$$

$$\lambda_i = \frac{2 \cdot \pi \cdot j}{m_i}$$

In the above equations, $k_i$ is the number of harmonics required for the ith seasonal period, $\lambda$ is the Box-Cox transformation, and $\gamma_1^{(i)}$ and $\gamma_2^{(i)}$ represent smoothing parameters.

Thus, the TBATS model has parameters 120 T, $m_i$, $k_i$, $\lambda$, $\alpha$, $\beta$, $\varphi$, $\theta$, $\gamma_1^{(i)}$ and $\gamma_2^{(i)}$. The final model can be chosen using the Akaike information criterion (AIC) from alternatives that include (but are not limited to):

with and without the Box-Cox transformation
with and without trend
with and without trend damping
with and without ARMA(p, q) process to model residuals
with and without seasonality
variations in the number of harmonics used to model seasonal effects The forecast module 134 obtains a time series of recently collected metrics for each entity from the data repository 200 and inputs the data into the corresponding time-series model generated by the training module 133. In turn, the time-series model outputs predictions 135 of future values in the time series as a predicted workload, resource utilization, and/or performance associated with the entity. These forecasts may detect a potential future anomaly, error, outage, and/or failure in the operation of hardware and/or software resources associated with the entity.

When an anomaly is predicted in metrics for a given entity, the resource management system 130 communicates the predicted anomaly to one or more users involved in managing use of the monitored systems by the entity. For example, resource management system 130 may include the user interface 140 or may transmit information to a user interface 140 having a graphical user interface (GUI), web-based user interface, mobile user interface, voice user interface, and/or another type of user interface that displays a plot of metrics as a function of time. The plot additionally includes representations of one or more thresholds for metrics and/or forecasted values of metrics from a time-series model for the corresponding entity. When the forecasted values violate a given threshold, the user interface displays highlighting, coloring, shading, and/or another indication of the violation as a prediction of a future anomaly or issue in the entity's use of the monitored systems.

In another example, resource management system 130 may generate an alert, notification, email, and/or another communication of the predicted anomaly to an administrator of the monitored systems to allow the administrator to take preventive action (e.g., allocating and/or provisioning additional resources for use by the entity before the entity's resource utilization causes a failure or outage).

The forecast module 134 includes a staleness determining module 136 that performs a recurring analysis of the selected models to determine whether the models are stale. For example, if the staleness determining module 136 determines that the models are more than one week old or have an error rate that exceeds a predetermined threshold, the resource management system 130 may re-train a model using the training module 133 and the most recent historical data 210 obtained by the monitoring module 131.

In one or more embodiments, resource-management system 130 may include more or fewer components than the components illustrated in FIG. 2. For example, training module 133 and monitoring module 131 may include, execute with, or exclude one another. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, a data repository (e.g., data repository 200) is any type of storage unit and/or device (e.g., a file system, database, collection of tables, or any other storage mechanism) for storing data. The data repository may be implemented or may execute on the same computing system as training module 133 and monitoring module 131 or on a computing system that is separate from training module 133 and monitoring module 131. The data repository may be communicatively coupled to training module 133 and monitoring module 131 via a direct connection or via a network. Further, the data repository may include multiple different storage units and/or devices. The multiple different storage units and/or devices may or may not be of the same type or located at the same physical site.

In one or more embodiments, resource-management system 130 refers to hardware and/or software configured to perform operations described herein for forecasting computational workloads. Examples of such operations are described below.

In an embodiment, resource-management system 130 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, a user interface refers to hardware and/or software configured to facilitate communications between a user and resource-management system 130. The user interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface is specified in one or more other languages, such as Java, C, or C++.

3. Time-Series Analysis for Forecasting Computational Workloads

Figure 3:
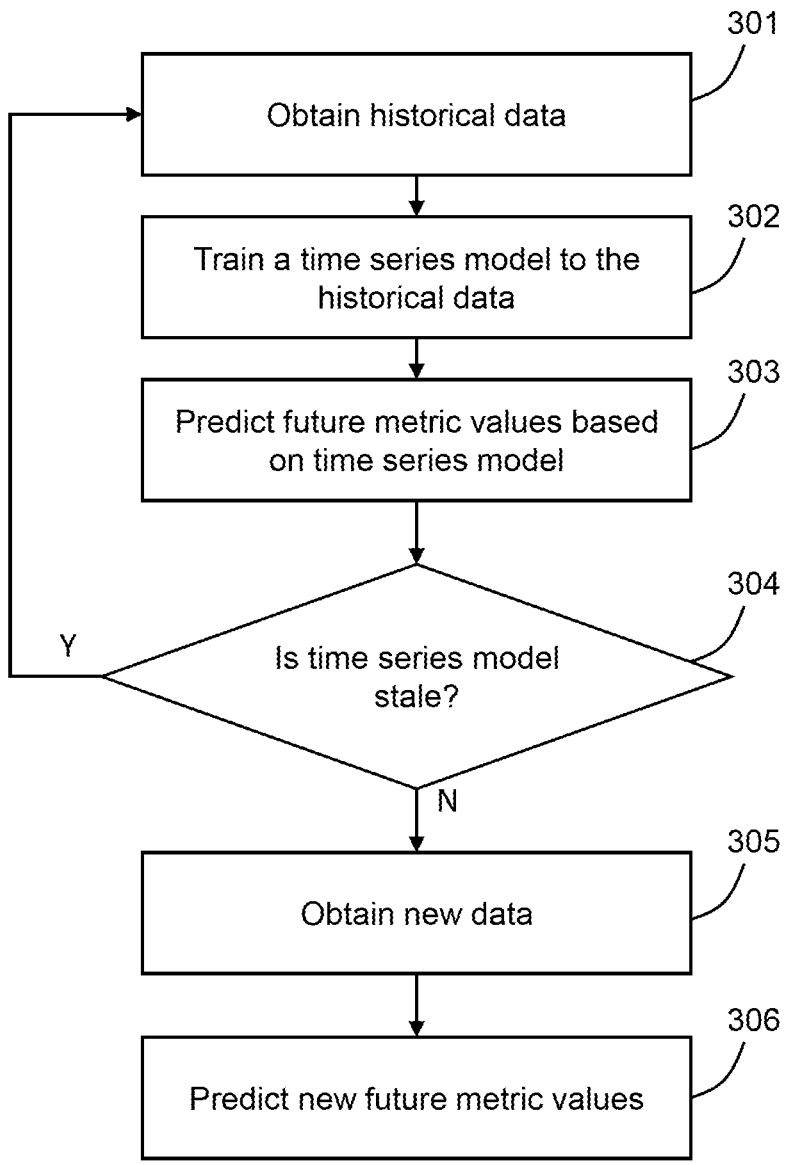
FIG. 3 illustrates a flowchart of performing time-series analysis for forecasting computational workloads in accordance with one or more embodiments.

FIG. 3 illustrates a flowchart of performing time-series analysis for forecasting computational workloads in accordance with one or more embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a resource management system for a monitored system obtains historical time-series data containing metrics collected from the monitored system (Operation 301). The resource management system may obtain the historical time-series data for a given entity (e.g., a combination of a customer, metric, and level of granularity) from a data repository. For example, a resource management system may match entity attributes for an entity to records storing historical time-series data for the entity in a database (e.g., metrics collected from the entity over the past week, month, year, and/or another period). Each record may include a value of a metric, a timestamp representing the time at which the value was generated, and/or an index representing the position of the value in the time series.

The resource management system trains at least one time-series model to the historical data (Operation 302).

Figure 4:
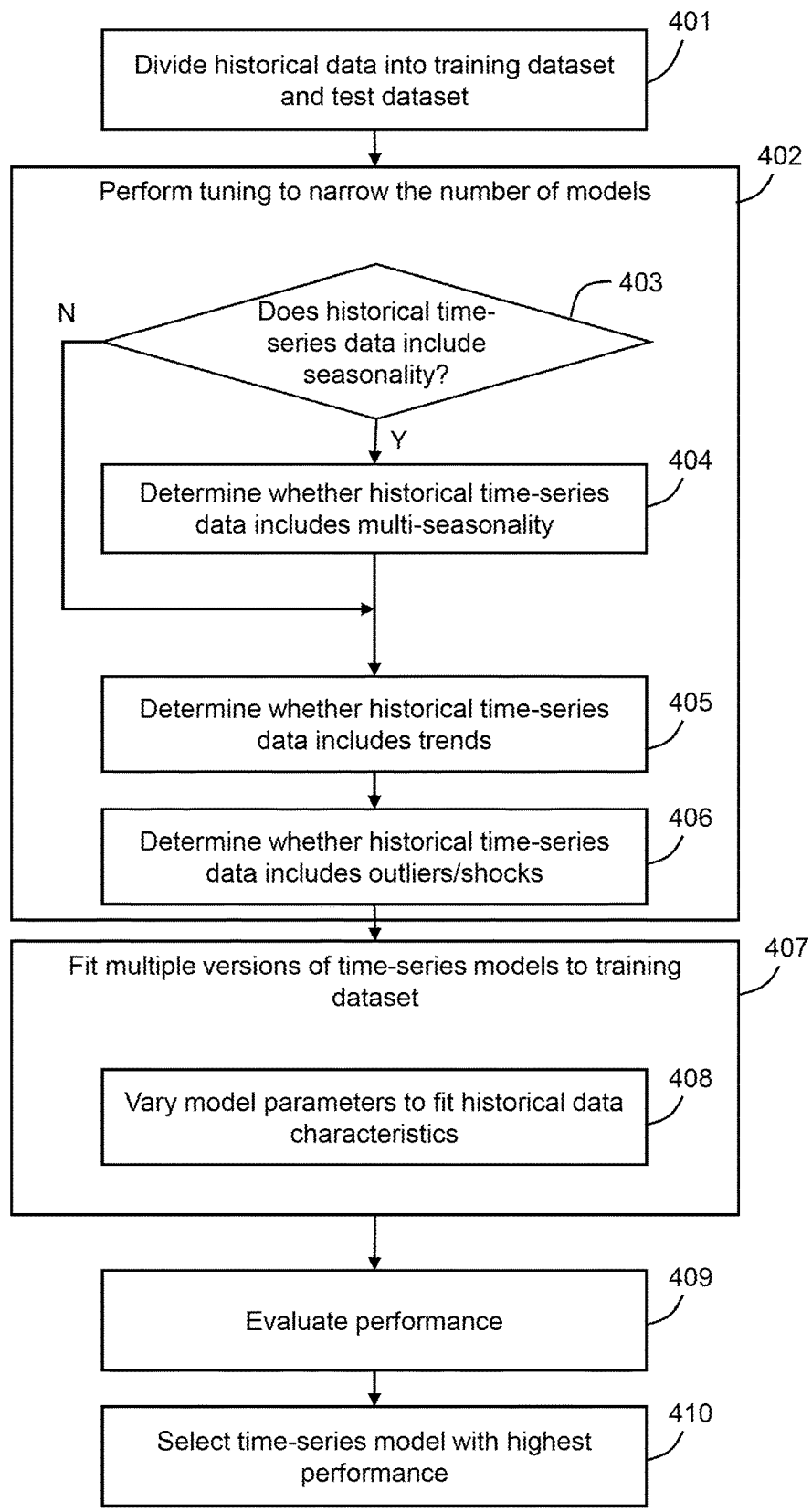
FIG. 4 illustrates a flowchart of training time-series models in accordance with one or more embodiments.

FIG. 4 illustrates a process by which the resource management system trains a time-series model to historical data. In one or more embodiments, one or more of the steps may be omitted, repeated, and/or performed in a different order. Accordingly, the specific arrangement of steps shown in FIG. 4 should not be construed as limiting the scope of the embodiments.

The resource management system divides the historical time-series data into a training dataset and a test dataset to train a set of time-series modes (Operation 401). For example, the resource management system may populate training dataset with a majority of the time-series data (e.g., 70-80%) and test dataset 116 with the remainder of the time-series data. In some embodiments, the resource management system selects the size of test dataset to represent the forecast horizon of each time-series model, which depends on the granularity of the time-series data. For example, the resource management system may include, in test dataset, 24 observations spanning a day for data that is collected hourly; seven observations spanning a week for data that is collected daily; and/or four observations spanning approximately a month for data that is collected weekly. The resource management system optionally uses a cross-validation technique to generate multiple training datasets and test datasets from the same time-series data.

The resource management system performs a tuning operation to narrow down the number of models to be analyzed (Operation 402). In one embodiment, the resource management system utilizes an autocorrelation function (ACF) or partial autocorrelation function (PACF) to find a number of autoregressive terms to be used by the time-series models. For example, using an autocorrelation function, a set of time-series data is copied and the copy is adjusted to lag the original set of time-series data. By comparing the original set of time-series data with multiple copies having different lag times, patterns, such as seasonality, in the historical data are identified.

By performing the tuning operation, the resource management system determines whether the historical data includes seasonal patterns (Operation 403), multi-seasonal patterns (Operation 404), trends (Operation 405), and outliers or shocks (Operation 406). Based on the identified characteristics of the historical time-series data, the resource management system selects particular time-series models that are likely a good fit for the historical data. For example, in an embodiment in which the resource management system computes the ACF/PACF and identifies multi-seasonality in the historical data, the resource management system may select a model, such as an ARIMA-type model, to be trained to the historical data. In an embodiment in which the ACF/PACF computation identifies outliers or shocks in the historical data, the resource management system may select a model, such as a SARIMAX-type model, to be trained to the historical data. The resource management system may select from among multiple different types of models to be trained to the historical data, and different types of models may be fit to the training dataset to be evaluated. For example, the resource management system may compute the ACF/PACF and determine that both an ARIMA-type model and a SARIMAX-type model have a similar likelihood of being a fit for the historical data.

Upon identifying one or more types of models as being a possible fit for the historical data, the resource management system fits multiple versions of the selected time-series models to the training dataset (Operation 407). Specifically, the resource management system uses the training dataset to train a set of time-series models with different parameters (Operation 408). For example, the resource management system may use the Box-Jenkins method and/or another method to generate a search space of parameters for various ARIMA-type models and/or TBATS-type models. In an embodiment in which an ARIMA-type model is selected to be fit to the training dataset, parameters (p, d, q) are present and the resource management system uses different values for the parameters to identify the search space of the parameters. The resource management system then uses a maximum likelihood estimation (MLE) technique, ordinary least squares (OLS) technique, and/or another technique to fit each model to the training dataset.

After the resource management system creates a set of time-series models from the training dataset, the resource management system uses test dataset to evaluate the performance of each model (Operation 409). In particular, the resource management system uses time-series models to generate predictions of values in test dataset, based on previously observed values in the time-series data. The resource management system also determines accuracies of time-series models based on comparisons of predictions and the corresponding values of test dataset. For example, the resource management system calculates a mean squared error (MSE), root MSE (RMSE), AIC, and/or another measure of model quality or accuracy between predictions and corresponding test dataset values for all time-series models generated from historical time-series data for the entity.

In one embodiment, the time-series models include exogenous variables to account for spikes or outliers in the historical data. In one embodiment, future data points predicted by the time-series models do not incorporate any influence of the exogenous variable. In an alternative embodiment, future data points predicted by the time-series model incorporate an influence of the exogenous variable by accepting as input a value for the exogenous variable. In addition, or in the alternative, in one embodiment, the time-series model incorporates an influence of the exogenous variable on future data points predicted by the first time-series model by reducing a weight given to the exogenous variable relative to other variables in the first time-series model representing a seasonality pattern in the historical data.

In one embodiment, the resource management system utilizes Fourier transforms of the time-series model to determine the accuracy of the time-series models. The resource management system may apply Fourier transforms to the time-series models to compare the time-series models to the test dataset to determine the accuracy of the respective time-series models.

Finally, the resource management system generates selections of one or more time-series models for use in evaluating subsequent time-series metrics for the same entity (Operation 410). For example, the resource management system includes, in the selections, one or more time-series models with the highest accuracies in predicting values in test dataset.

After one or more best-performing time-series models are selected for one or more entities, the resource management system stores parameters of each model in a model repository. The resource management system also, or instead, provides a representation of the model to a monitoring module, a user interface, and/or other components of resource-management system. In one or more embodiments, the best-performing time-series models include components to account for seasonality, multi-seasonality, and shocks or outliers in the historical time-series data. These components of the time-series models improve the accuracy of the models and allow the models to be adapted to various types of time-series data collected from the monitored systems. In one embodiment, the time-series models include an exogenous variable that accounts for outliers in the historical time-series data, so that the outliers in the model generated with the historical time-series data do not affect values of the metrics in forecasts of the resource management system.

In one embodiment, the resource management system applies a Fourier transform to the time-series models. For example, when multiple seasons are detected in the time series, seasonal patterns may be represented using Fourier terms.

Returning to FIG. 3, in one or more embodiments, the resource management system uses time-series models selected by the resource management system to generate forecasts of time-series metrics (Operation 303). For example, the resource management system may forecast workloads and/or utilizations related to processor, memory, storage, network, I/O, thread pools, and/or other types of resources in the monitored systems.

To produce forecasts, the resource management system inputs a time series of recently collected metrics for each entity into the corresponding time-series model. In turn, the time-series model outputs predictions of future values in the time series as a predicted workload, resource utilization, and/or performance associated with the entity.

The resource management system may additionally include functionality to predict anomalies based on comparisons of forecasts with corresponding thresholds. For example, thresholds may represent limits on utilization of resources by the entities and/or service level objectives for performance metrics associated with the entities. When a forecasted metric violates (e.g., exceeds) a corresponding threshold, the resource management system may detect a potential future anomaly, error, outage, and/or failure in the operation of hardware and/or software resources associated with the entity.

When an anomaly is predicted in metrics for a given entity, the resource management system communicates the predicted anomaly to one or more users involved in managing use of the monitored systems by the entity. For example, the resource management system may include a graphical user interface (GUI), web-based user interface, mobile user interface, voice user interface, and/or another type of user interface that displays a plot of metrics as a function of time. The plot additionally includes representations of one or more thresholds for metrics and/or forecasted values of metrics from a time-series model for the corresponding entity. When the forecasted values violate a given threshold, the user interface displays highlighting, coloring, shading, and/or another indication of the violation as a prediction of a future anomaly or issue in the entity's use of the monitored systems. In another example, monitoring module may generate an alert, notification, email, and/or another communication of the predicted anomaly to an administrator of the monitored systems to allow the administrator to take preventive action (e.g., allocating and/or provisioning additional resources for use by the entity before the entity's resource utilization causes a failure or outage).

The resource management system continually monitors the time-series models used to predict future metrics for an entity to determine whether the models are stale (Operation 304). The resource management system determines that a time-series model is stale if its error rate exceeds a predetermined threshold or if a predetermined period has elapsed. According to one embodiment, the resource management system determines that a time-series model is stale if a root mean squared error (RMSE) falls below 95% accuracy. Alternative embodiments encompass any desired level of accuracy of the time-series model. In addition, or in the alternative, the resource management system may determine that the time-series model is stale if more than one week has elapsed since it was trained. While a week is provided as an example of a time-table for determining if a time-series model is stale, embodiments encompass any period of time, which may be adjusted according to the granularity of the historical data and forecasts.

After a period has lapsed since a given time-series model has been trained, used to generate forecasts, and/or predict anomalies, the resource management system retrains the time-series model using more recent time-series data from the corresponding entity (Operation 301). For example, the resource management system may regularly obtain and/or generate a new training dataset and test dataset from metrics collected over a recent number of days, weeks, months, and/or another duration. The resource management system may use the new training dataset to generate a set of time-series models with different combinations of parameter values and evaluate accuracies of the generated time-series models using the new test dataset. The resource management system may then select one or more of the most accurate and/or highest performing time-series models for inclusion in model repository and/or for use by monitoring module in generating forecasts and/or predicting anomalies for the entity over the subsequent period.

If the resource management system determines that the time-series model is not stale, the resource management system obtains a time series of newly-collected metrics for each entity (Operation 305) and provides the newly-collected metrics to the time-series model to predict new future values (Operation 306).

Figure 5:
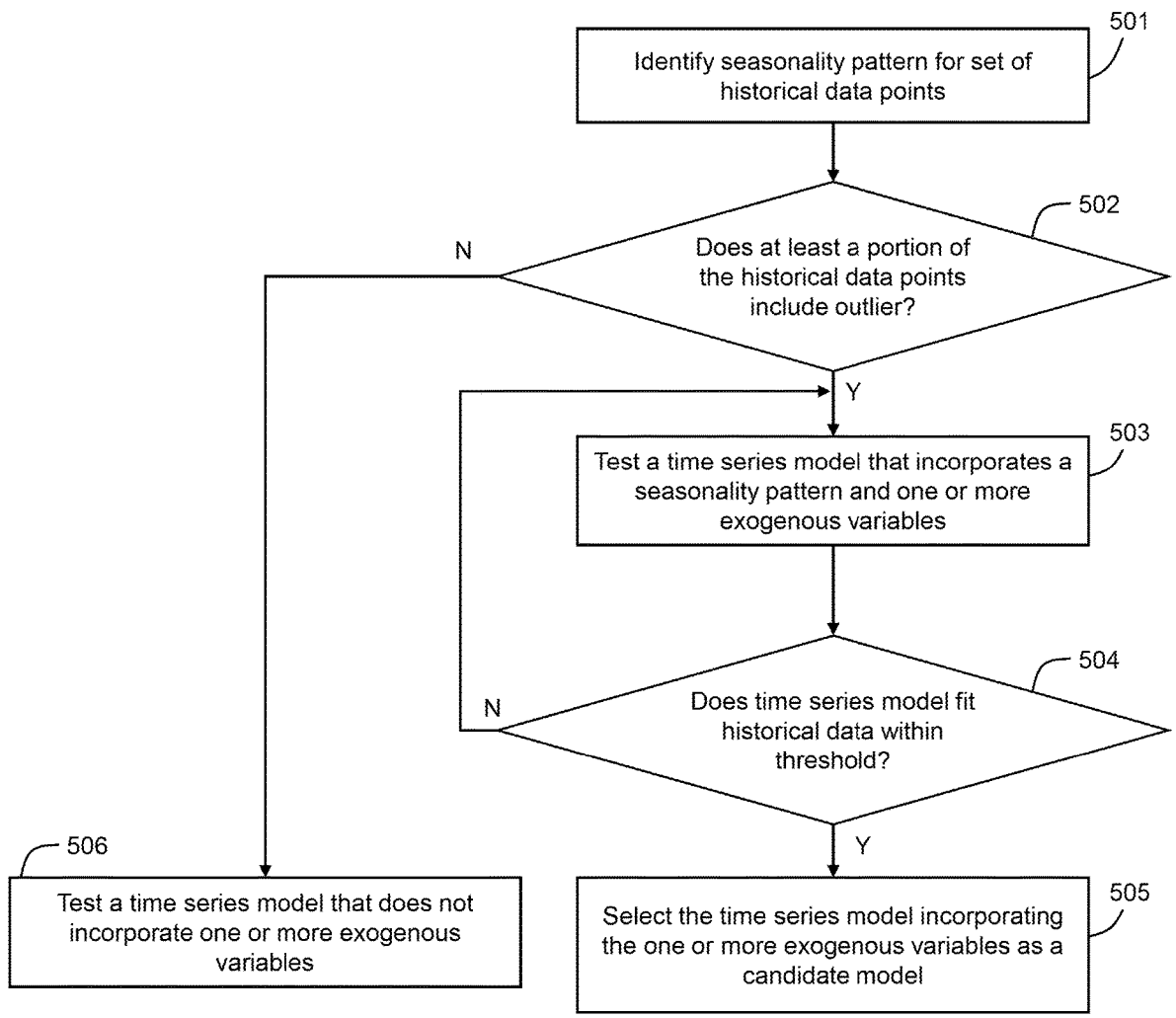
FIG. 5 illustrates a flowchart of selecting a model having exogenous variables according to one or more embodiments.

FIG. 5 illustrates in further detail a process by which the resource management system selects a model including one or more exogenous variables. In one or more embodiments, one or more of the steps may be omitted, repeated, and/or performed in a different order. Accordingly, the specific arrangement of steps shown in FIG. 4 should not be construed as limiting the scope of the embodiments.

The resource management system identifies a seasonality pattern for a set of historical data points (Operation 501). The resource management system determines whether at least a portion of the historical datapoints includes an outlier or shock (Operation 502). In one embodiment, the resource management system utilizes an autocorrelation function (ACF) or partial autocorrelation function (PACF) to find a number of autoregressive terms to be used by the time-series models and to identify whether the historical data includes an outlier or shock. However, embodiments of the invention are not limited to these types of functions. Embodiments encompass any functions that may be applied to historical data to recognize outliers in the historical data.

If the resource management system identifies one or more outliers in the historical data, the resource management system tests a time-series model that incorporates a seasonality pattern and one or more exogenous variables (Operation 503). The resource management system determines whether the time-series model fits the historical data within a predetermined threshold (Operation 504). If the time-series model fits the historical data within a predetermined threshold, the resource management system selects the time-series model as a candidate for predicting future metrics (Operation 505). For example, referring to FIG. 4, the resource management system compares selected candidate models to determine which has the best performance, and selects the best time-series model to predict future metrics (FIG. 4, Operation 410).

If the resource management system determines that the historical data does not include an outlier or shock (Operation 502), the resource management system tests a time-series model that does not incorporation an exogenous variable (Operation 506).

4. Anomaly Detection Using Forecasted Computational Workloads

Figure 6:
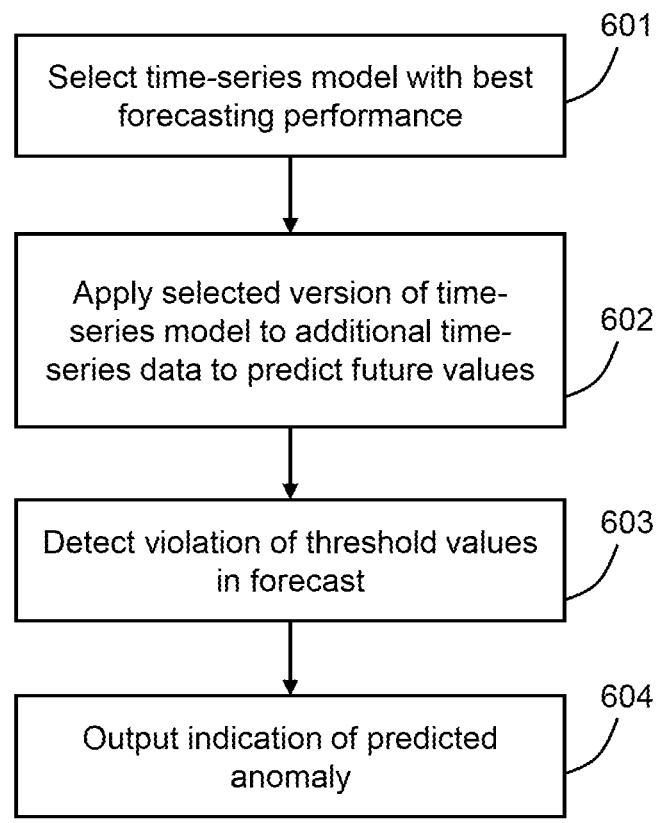
FIG. 6 illustrates a flowchart of anomaly detection using forecasted computational workloads in accordance with one or more embodiments.

FIG. 6 illustrates a flowchart of anomaly detection using forecasted computational workloads in accordance with one or more embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a resource management system selects a version of a time-series model with a best performance in predicting metrics from among multiple versions of the time-series model fitted to historical time-series data containing the metrics collected from a monitored system (Operation 601). For example, the version may be selected from multiple versions with different combinations of parameters used to create the time-series model.

Next, the resource management system applies the selected version to additional time-series data collected from the monitored system to generate a prediction of future values from the metrics (Operation 602). For example, the selected version generates the predictions based on previously observed values of the metrics.

The resource management system monitors the predicted metrics and detects when the predicted metrics violate a predetermined threshold (Operation 603). When the prediction violates the predetermined threshold associated with the metrics, the resource management system generates an indication of a predicted anomaly in the monitored system (Operation 604). For example, the predicted future values are compared with a threshold representing an upper limit for the metrics (e.g., 80% utilization of a resource). When some or all of the predicted future values exceed the threshold, an alert, notification, and/or another communication of the violated threshold is generated and transmitted to an administrator of the monitored system.

5. Example Embodiment of Time-Series Model Including Exogenous Variable

Figure 7:
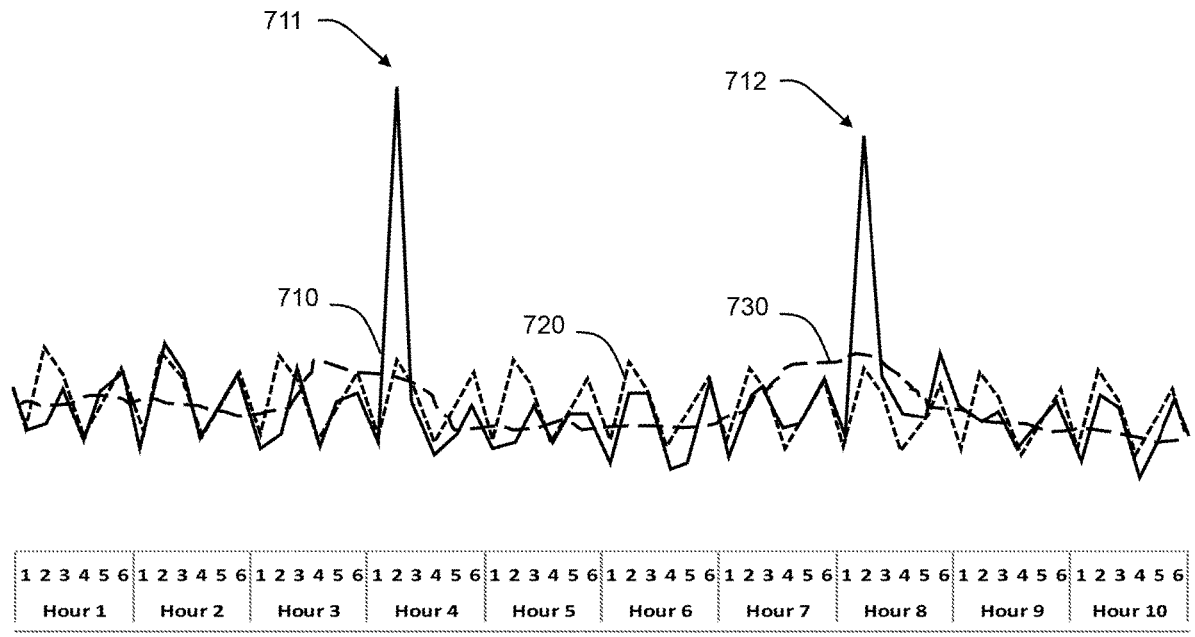
FIG. 7 illustrates an embodiment of a time-series model including an exogenous variable according to one or more embodiments.

FIG. 7 illustrates a graph illustrating the prediction of metrics using a time-series model according to one embodiment of the invention. In FIG. 7, the line 710 represents a measured metric which may make up historical data used by a resource management system to train a time-series model for forecasting metric values of a monitored system. Line 720, shown as a dashed line, represents a forecast generated by the resource management system, and line 730, shown as a dotted line, represents a cumulative average value and is shown for purposes of comparison.

In embodiments of the invention, a time-series model may include variables or components to account for seasonality (such as a repetitive peak or trough at a particular hour of the day), multi-seasonality (such as a repetitive peak or trough on a particular day of the week, as well as the repetitive peaks and troughs at particular hours of the day), and trends (such as an increase over time or decrease over time, with seasonality and multi-seasonality).

Embodiments further include time-series models having exogenous variables to account for spikes or outliers, pointed to by reference numerals 711 and 712. Spikes or outliers may correspond to events, such as irregularly scheduled back-ups of a system, requiring significant resources, or any external event causing a non-recurring or irregularly-occurring spike in metric values in historical data. In embodiments in which the time-series models include exogenous variables, these spikes or outliers may be accounted for in the models, and the values of the outliers are not incorporated into future predictions or forecasts. In other words, while spikes or outliers in historical data used to train a time-series model may normally have a tendency to skew predictions toward the values of the spikes or outliers, embodiments in which the time-series models include exogenous variables are able to account for the spikes or outliers when the model is being trained to the historical data. As a result of including exogenous variables in the time-series models, the forecasts produced by the time-series models are not skewed by the spikes or outliers in the historical data used to train the time-series models.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
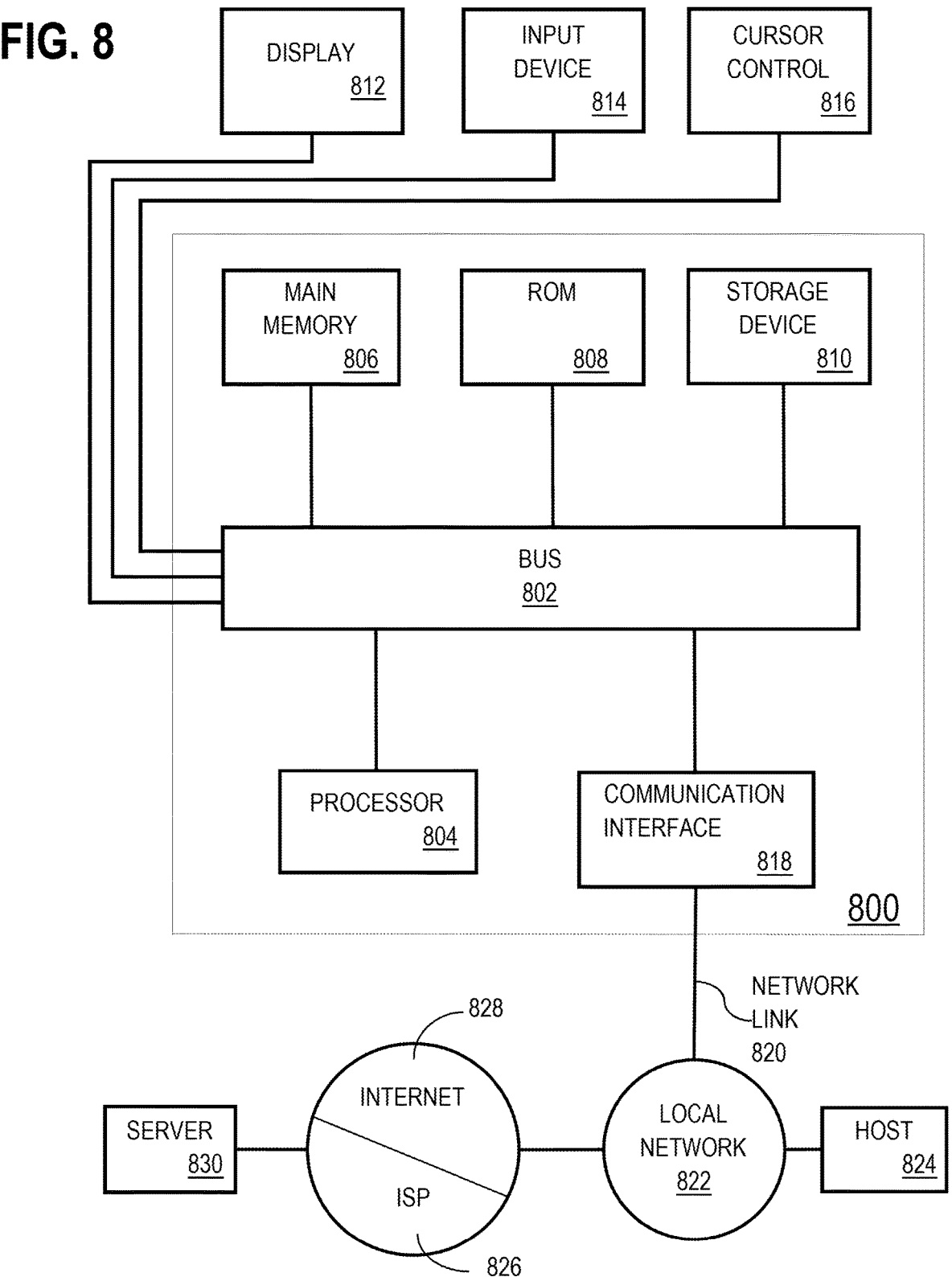
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822.

For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause performance of operations comprising:
   receiving a set of historical data points of a data set;
   determining that a first portion of the set of historical data points comprise at least one outlier that does not correspond to at least one seasonality pattern associated with a second portion of the set of historical data points;
   testing a first time-series model that incorporates a first exogenous variable corresponding to a first exogenous factor to determine that the first time-series model fits both the first portion of the set of historical data points and the second portion of the set of historical data points within an error threshold; and
   selecting the first time-series model to predict future data points of the data set;
   determining whether the first time-series model is stale by determining:
      whether the first time-series model is older than a threshold expiration value; or
      whether the first time-series model has a root means square error (RMSE) that falls below a threshold percentage;
   based on determining that the first time-series model is stale,
      receiving a new set of historical data points of a second data set;
      testing a second time-series model that incorporates a second exogenous variable corresponding to a second exogeneous factor; and
   selecting the second time-series model to predict future data points of the second data set.

2. The one or more non-transitory machine-readable media of claim 1, wherein the future data points predicted by the first time-series model do not incorporate any influence of the first exogenous variable.

3. The one or more non-transitory machine-readable media of claim 1, wherein the future data points predicted by the first time-series model incorporate an influence of the first exogenous variable by accepting as input a value for the first exogenous variable.

4. The one or more non-transitory machine-readable media of claim 1, wherein the first time-series model incorporates an influence of the first exogenous variable on future data points predicted by the first time-series model by reducing a weight given to the first exogenous variable relative to first variables in the first time-series model representing the at least one seasonality pattern.

5. The one or more non-transitory machine-readable media of claim 1, wherein the operations further comprise:
   testing a second time-series model that incorporates a second exogenous variable corresponding to a second exogeneous factor to determine that the second time-series model does not fit both the first portion of the set of historical data points and the second portion of the set of historical data points within the error threshold; and
   refraining from selecting the second time-series model based on testing the second time-series model.

6. The one or more non-transitory machine-readable media of claim 1, wherein the operations further comprise:
   determining a first score for the first time-series model based on a fit of the first time-series model to both the first portion of the set of historical data points and the second portion of the set of historical data points; and
   determining a second score for a second time-series model based on a fit of the second time-series model to both the first portion of the set of historical data points and the second portion of the set of historical data points,
   wherein the selecting operation is responsive to determining that the first time-series model is a better fit for the data set than the second time-series model based on the first score and the second score.

7. The one or more non-transitory machine-readable media of claim 6, wherein the second time-series model does not include any exogenous variable.

8. The one or more non-transitory machine-readable media of claim 6, wherein the second time-series model includes a second exogenous variable.

9. The one or more non-transitory machine-readable media of claim 1, wherein testing a first time-series model comprises:
   performing a Fourier transform on the first time-series model.

10. The one or more non-transitory machine-readable media of claim 1, wherein the first time-series model includes the first exogenous variable and variables corresponding to the at least one seasonality pattern and to at least one multiple-seasonality pattern in the set of historical data points.

11. The one or more non-transitory machine-readable media of claim 1, wherein the data set is obtained from a workload of a computing system, and
the operations further comprise:
generating a recommendation for modifying the computing system based on the predicting the future data points.

12. One or more non-transitory machine-readable media storing instructions which, when executed by one or more processors, cause performance of operations comprising:
receiving a set of historical data points of a data set;
determining that a first portion of the set of historical data points comprise at least one outlier that does not correspond to at least one seasonality pattern associated with a second portion of the set of historical data points;
testing a first time-series model that incorporates a first exogenous variable corresponding to a first exogeneous factor to determine that the first time-series model fits both the first portion of the set of historical data points and the second portion of the set of historical data points within an error threshold;
selecting the first time-series model to predict future data points of the data set;
determining whether the first time-series model is stale by determining:
whether the first time-series model is older than a threshold expiration value; or
whether the first time-series model has a root means square error (RMSE) that falls below a threshold percentage;
based on determining that the first time-series model is not stale,
receiving a new set of historical data points of a second data set; and
using the first time-series model to predict future data points of the second data set.

13. A method, comprising:
receiving a set of historical data points of a data set;
determining that a first portion of the set of historical data points comprise at least one outlier that does not correspond to at least one seasonality pattern associated with a second portion of the set of historical data points;
testing a first time-series model that incorporates a first exogenous variable corresponding to a first exogeneous factor to determine that the first time-series model fits both the first portion of the set of historical data points and the second portion of the set of historical data points within an error threshold;
selecting the first time-series model to predict future data points of the data set;
determining whether the first time-series model is stale by determining:
whether the first time-series model is older than a threshold expiration value; or
whether the first time-series model has a root means square error (RMSE) that falls below a threshold percentage;
based on determining that the first time-series model is stale,
receiving a new set of historical data points of a second data set;

testing a second time-series model that incorporates a second exogenous variable corresponding to a second exogeneous factor; and
selecting the second time-series model to predict future data points of the second data set.

14. The method according to claim 13, wherein the future data points predicted by the first time-series model do not incorporate any influence of the first exogenous variable.

15. The method according to claim 13, wherein testing a first time-series model comprises:
performing a Fourier transform on the first time-series model.

16. The method according to claim 13, wherein the first time-series model includes the first exogenous variable and variables corresponding to the at least one seasonality pattern and to at least one multiple-seasonality pattern in the set of historical data points.

17. The method according to claim 13, wherein the data set is obtained from a workload of a computing system, and the method further comprises:
generating a recommendation for modifying the computing system based on the predicting the future data points.

18. A method comprising:
receiving a set of historical data points of a data set;
determining that a first portion of the set of historical data points comprise at least one outlier that does not correspond to at least one seasonality pattern associated with a second portion of the set of historical data points;
testing a first time-series model that incorporates a first exogenous variable corresponding to a first exogeneous factor to determine that the first time-series model fits both the first portion of the set of historical data points and the second portion of the set of historical data points within an error threshold;
selecting the first time-series model to predict future data points of the data set;
determining whether the first time-series model is stale by determining:
whether the first time-series model is older than a threshold expiration value; or
whether the first time-series model has a root means square error (RMSE) that falls below a threshold percentage;
based on determining that the first time-series model is not stale,
receiving a new set of historical data points of a second data set; and
using the first time-series model to predict future data points of the second data set.

19. An apparatus, comprising:
a monitoring module configured to monitor a system to obtain metrics data from the system, and to store the metrics data in a data repository as historical data;
a training module configured to:
receive a set of historical data points of a data set;
determine that a first portion of the set of historical data points comprise at least one outlier that does not correspond to at least one seasonality pattern associated with a second portion of the set of historical data points;
test a first time-series model that incorporates a first exogenous variable corresponding to a first exogeneous factor to determine that the first time-series model fits both the first portion of the set of historical data points and the second portion of the set of historical data points within an error threshold; and select the first time-series model to predict future data points of the data set; and a forecast module configured to:
    determine whether the first time-series model is stale by determining:
        whether the first time-series model is older than a threshold expiration value; or
        whether the first time-series model has a root means square error (RMSE) that falls below a threshold percentage, wherein the training module is further configured to:
    based on determining, by the forecast module, that the first time-series model is stale:
        receive a new set of historical data points of a second data set;
        test a second time-series model that incorporates a second exogenous variable corresponding to a second exogeneous factor; and
        select the second time-series model to predict future data points of the second data set.

* * * * *